A. Lamb,

Washing Machine,

No. 3,162. Reissued Oct. 20, 1868.

Witnesses.

J. Alfred Ellis

J. V. White

Inventor.

Alford Lamb per T. K. Alexander

Attys.

N. PETERS, PHOTO-LITHOGRAPHER, WASHINGTON, D. C.

United States Patent Office.

ALFORD LAMB, MARY E. LAYMAN, AND WILLIAM H. MORSE, OF JEFFERSONVILLE, NEW YORK, ASSIGNEES OF ALFORD LAMB.

*Letters Patent No.* 74,919, *dated February* 25, 1868; *reissue No.* 3,162, *dated October* 20, 1868.

IMPROVED WASHING-MACHINE.

The Schedule referred to in these Letters Patent and making part of the same.

*To all whom it may concern:*

Be it known that I, ALFORD LAMB, of Jeffersonville in the county of Sullivan, and State of New York, have invented a new and useful Improvement in Washing-Machines; and I do hereby declare the following to be a full, clear, and exact description of the same, reference being had to the accompanying drawings, and to the letters of reference marked thereon, which form a part of this specification, in which—

Figure 1:
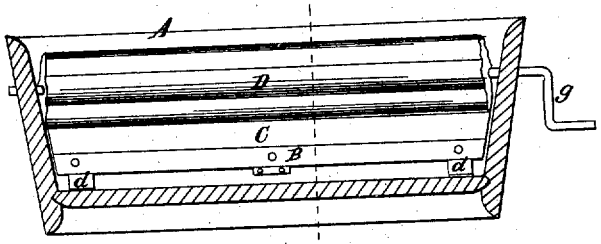

Figure 1 is a section in front of the roller, and

Figure 2:
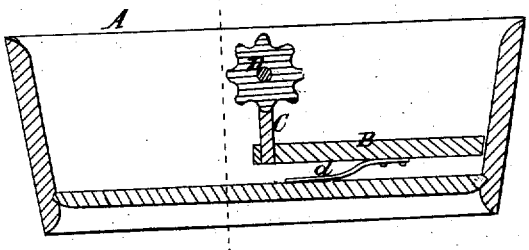

Figure 2 a transverse section.

My invention consists in the employment of an auxiliary base, supported by springs, upon which is fastened endwise a strip or strips of rubber, and above which a fluted roller is arranged. The clothes to be washed are introduced into the throat or opening, between the fluted roller and the rubber.

To enable others skilled in the art to make and use my invention, I will now describe its construction and operation.

A represents a tub or vessel, which may be a common wash-tub.

D represents a grooved roller, which is provided with axles, which have their bearings in the tub A. At one end of the roller is the crank *g*, by means of which it is operated.

B represents a base, upon which are fastened one or more strips of India rubber, C. This base may be constructed in a semicircular form, or like the letter T, or in any convenient form, and so attached to the tub or frame in which the grooved roller is placed, that the part of it on which the strip or strips of rubber are fastened will be free to move from and toward the grooved roller, the only purpose of the base being to fasten the strips of India rubber and receive the action of the springs *d d*.

*d d* are springs which act upon the base B, their use being to allow the base to move from the grooved roller, and thus enlarge the space between when a pressure is applied, and to return it to its original position when the pressure is removed. They may be secured in any known way, so as to produce the action and effect above mentioned.

C represents a strip of India rubber, standing edgewise to the base, upon which it is fastened, and to the grooved roller D. It may be bolted or screwed, or fastened in any other known way, to the springing-base B, or its equivalent, so that it stands edgewise to it and the roller, and nearly or quite in a line parallel to the bearings of said roller, and nearly or quite in contact with the elevations of the roller. The strip of India rubber is to project sufficiently from the base, and to be of such a thickness as to allow it to spring laterally when the roller is revolved, and, at the same time, to offer a sufficient resistance to the clothes passing through, between it and the grooved roller, to force the springs acting on the base to yield in their line of motion, and enlarge the throat or space between the rubber and roller, thus forming a compound or double-acting spring. And while the strip is springing from one groove to another of the roller, and rubbing and pressing the clothes, the springing-base gives way from the roller more or less, and regulates the size of the passage-way or throat for different thicknesses of clothes. Any desired number of strips of India rubber may be placed by the side of strip C.

To operate my machine, fill the tub to the bottom of the roller, or a little above, with water, and place one end of the article to be washed between the roller and strip of rubber, and, by turning the crank, it will be fed through and rubbed until it is thoroughly cleansed, without tearing or injuring the articles in the least. After the washing-process is completed, the clothes can be perfectly rinsed by a similar operation.

What I claim as new, and desire to secure by Letters Patent, is—

1. The combination of the base, B, supported by springs, and a strip or strips of rubber, C, arranged as described.

2. The combination of the above with the fluted roller D, substantially as described.

In testimony that I claim the foregoing as my own, I affix my signature in presence of two witnesses.

ALFORD LAMB.

Witnesses:

ISAAC ANDERSON,

JOSIAH SMITH.